United States Patent [19]

Heidjann et al.

[11] Patent Number: 4,526,181
[45] Date of Patent: Jul. 2, 1985

[54] SELF-PROPELLED HARVESTER THRESHER

[75] Inventors: Franz Heidjann; Johannes Dammann, both of Harswinkel, Fed. Rep. of Germany

[73] Assignee: Claas Ohg, Harsewinkel, Fed. Rep. of Germany

[21] Appl. No.: 545,612

[22] Filed: Oct. 18, 1983

[30] Foreign Application Priority Data

Oct. 26, 1982 [DE] Fed. Rep. of Germany ....... 3239552

[51] Int. Cl.³ .......................... A01F 7/04; A01F 11/00
[52] U.S. Cl. .................................. 130/27 R; 130/27 P
[58] Field of Search ............ 56/14.6; 130/27 R, 27 Q, 130/27 S, 27 P

[56] References Cited

U.S. PATENT DOCUMENTS

| | | | |
|---|---|---|---|
| 796,117 | 8/1905 | Dunkelberger | 130/27 P |
| 882,896 | 3/1908 | Landis | 130/27 P |
| 961,775 | 3/1909 | Herr | 130/27 Q |
| 1,193,751 | 8/1916 | Bangen | 130/27 Q |
| 1,408,770 | 3/1922 | Nelson | 130/27 P |
| 1,761,346 | 6/1930 | Jelbart | 130/27 R |
| 2,292,650 | 8/1942 | Oehler et al. | 130/27 R |
| 2,507,669 | 5/1950 | Hath | 130/27 R |
| 3,296,782 | 1/1967 | Mark et al. | 56/14.6 |
| 3,555,790 | 1/1971 | Quick | 56/14.6 |
| 3,593,719 | 7/1971 | Ashton et al. | 130/27 R |
| 3,603,063 | 9/1971 | Stroburg et al. | 56/14.6 |
| 3,871,384 | 3/1975 | Depauw et al. | 130/27 L |
| 3,945,178 | 3/1976 | Delfosse et al. | 56/14.6 |
| 4,137,923 | 2/1979 | Druffel et al. | 56/14.6 |

*Primary Examiner*—Paul J. Hirsch
*Attorney, Agent, or Firm*—Michael J. Striker

[57] ABSTRACT

A self-propelled harvester thresher operating in accordance with an axial threshing principle has an axial threshing and separating mechanism located between a cutting mechanism trough and an inclined conveyor, and an introducing drum for introducing the product cut by the cutting mechanism trough into the axial threshing and separating mechanism and formed as an exchangeable threshing drum corresponding to a product to be threshed, so that a threshing and separating element of the threshing and separating mechanism thus performs only post threshing and separating functions.

8 Claims, 1 Drawing Figure

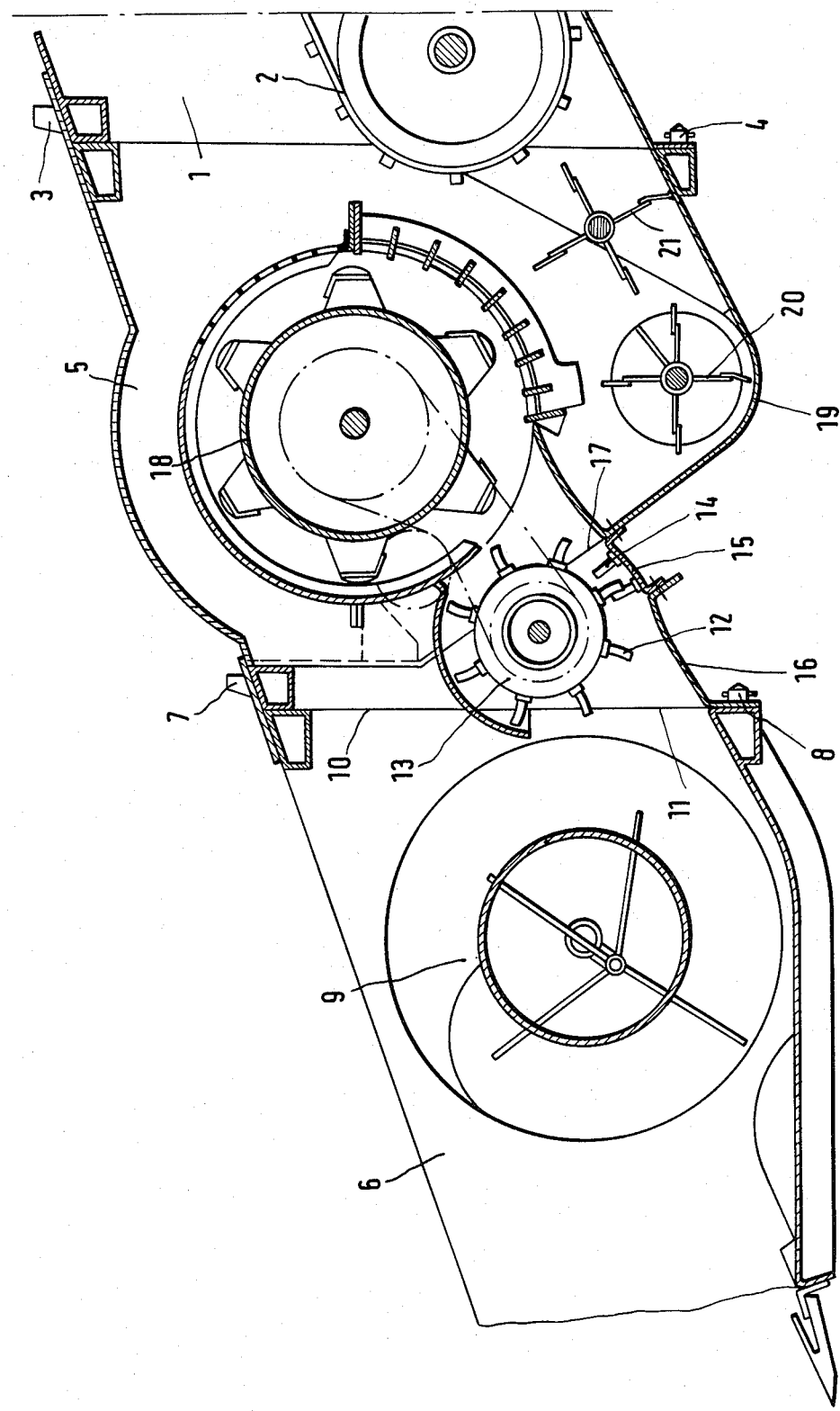

SELF-PROPELLED HARVESTER THRESHER

BACKGROUND OF THE INVENTION

The present invention relates to a self-propelled harvester thresher operating in accordance with the axial threshing principle.

Harvester threshers of the abovementioned general type are known in the art. A known self-propelled harvester thresher has a front driving and a rear steering axle, a front cutting mechanism trough, an inclined conveyor and a wind sieve device, and axial threshing and separating mechanism formed as an independent structural unit located prior to the driving axle between the inclined conveyor and a cutting mechanism trough and releasably connected with both these aggregates which are also formed as separate structural units. The axial threshing and separating mechanism is provided with at least one introducing drum which has a plurality of arms partially extending through a through-going opening in the cutting mechanism trough. Such a harvester thresher is disclosed, for example, in the U.S. patent application Ser. No. 389,232.

In the above-described known harvester thresher the product is taken by the introducing drum from the cutting mechanism trough and transverse to the axial threshing mechanism so that the threshing and separating process takes place in the latter. The axial threshing mechanism must be formed in correspondence with the respective product to be harvested. During threshing, for example of rape, the rotor must be provided with impact strips which cooperate with the respective counter strips. When the axial threshing mechanism provided with such elements are used for threshing of rice, so called coils are inevitably formed and a result of this at the time when rice reaches the ground it is very dry, on the one hand, and has a high fraction of leaves, on the other hand. For avoiding the coils the entire big and heavy extra threshing mechanism must be changed by another axial threshing mechanism in which the rotor is provided with pins arranged to cooperate with the fixably standing counter pins. This requires very high labor and material expenses.

SUMMARY OF THE INVENTION

Accordingly, it is an object of the present invention to provide a self-propelled harvester thresher which avoids the disadvantages of the prior art.

More particularly, it is an object of the present invention to provide a harvester thresher operating in accordance with the axial threshing principle in which an axial threshing mechanism can be used without reconstruction or disassembling for different products to be harvested, for example, can be used for threshing rape and rice.

In keeping with these objects and with others which will become apparent hereinafter, one feature of the present invention resides, briefly stated, in that an introducing drum of the harvester thresher is formed as a threshing drum adapted to a product to be threshed.

When the harvester thresher is designed in accordance with the present invention, the axial threshing mechanism performs only a function of post threshing and separation, whereas the threshing process proper takes place in the region of the introducing drum formed as a threshing drum. Since the introducing drum formed as a threshing drum is significantly lighter and smaller than the axial threshing mechanism, it can be easily exchanged without high expenditures if needed, for example, when a different product must be harvested.

In accordance with a further feature of the present invention, a threshing basket is exchangeably associated with the threshing drum and is formed of a tight bottom sheet with threshing projections arranged thereon. As a result of this, the respective inserted introducing drum can be associated with the respective basket. Because of the tightness of the bottom no grains are lost. They are transferred together with bigger partially threshed straw to the axial threshing mechanism.

For harvesting of rice, it is proposed in accordance with the present invention that the threshing drum be formed as a pin drum for rice threshing, while the threshing projections are formed as pins arranged on the bottom sheet.

An optimal threshing is obtained when the threshing basket is adjustable in a vertical direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE of the drawing is a view showing a section of a front part of a self-propelled harvester thresher operating on an axial threshing principle, in accordance with the present invention.

DESCRIPTION OF A PREFERRED EMBODIMENT

A self-propelled harvester thresher operating in accordance with an axial threshing principle is shown in the drawing and includes an inclined conveyor passage which is identified with reference numeral 1. A scraper chain 2 is arranged in the inclined conveyor passage 1 and supplies a product to be cleaned to a sieve device of the harvester thresher.

A known axial threshing mechanism is fixedly locked with the inclined conveyor channel 1 via known quick couplings 3 and 4. The axial threshing mechanism supports a cutting mechanism trough 6. The cutting mechanism trough 6 is connected with the axial threshing mechanism also by quick couplings 7 and 8. For the purpose of street transportation both the cutting mechanism trough 6 and the axial threshing mechanism 5 can be easily dismounted. Thereby their construction has no limitation as to their width. Moreover, these mechanisms can be designed exclusively with the consideration of a high throughput of the harvester thresher.

The product stream transported from the cutting mechanism trough 6 or a drawing screw 9 moves to a through-going opening 11 which is provided in a rear wall 10 of the cutting mechanism trough 6. Fingers 12 of a pin drum 13 partially extend through the through-going opening 11 of the rear wall 10 and take up the product. During the rotation of the pin drum 13 the harvested product is threshed by the fingers 12 and pins 14 cooperating with the fingers. Since the pins are arranged on a tight bottom sheet 15 which overlaps together with a further bottom sheet 16 the intermediate space between the cutting mechanism trough 6 and the axial threshing mechanism 5, the threshed grain cannot fall down, but instead it is moved together with the partially threshed out straw into the axial threshing mechanism 5. A post threshing takes place in the region in which the product is thrown through an opening 17 into the axial threshing mechanism 5.

With further movement of the product in the axial direction of a rotor 18, the product is only separated. The threshed out straw is withdrawn through a further not shown opening in the axial threshing mechanism and placed on the field as a windrow. The cleaned grain product which is collected in a trough 19 is transferred by a throw conveyor 20 and an intermediate conveyor 21 onto the scraper chain 2 supported in the inclined conveyor passage 11.

The harvester thresher in accordance with the shown embodiment serves for threshing of rice. When, for example, rape must be harvested and threshed, the relatively light and small pin drum 13 and the bottom sheet 15 provided with the pins 14 must be replaced by a drum provided with impact strips and a bottom sheet provided with counter strips. The big and heavy axial threshing mechanism is not to be replaced.

It will be understood that each of the elements described above, or two or more together, may also find a useful application in other types of constructions differing from the types described above.

While the invention has been illustrated and described as embodied in a self-propelled harvester thresher operating in accordance with an axial threshing principle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvester thresher, comprising a cutting mechanism trough for cutting a product and provided with a through-going opening; an axial threshing and separating mechanism operating in accordance with an axial threshing principle for threshing and separating the cut product; an inclined conveyor for transporting the threshed and separated product and arranged so that said axial threshing and separating mechanism is located between said cutting mechanism trough and said inclined conveyor; at least one introducing drum partially extending through said through-going opening of said cutting mechanism trough and provided for introducing the cut product into said axial threshing and separating mechanism, said introducing drum being formed as a threshing pin drum for rice threshing and being removably mounted to be exchanged; a threshing trough associated with said pin drum and formed as a tight bottom sheet with a plurality of threshing pins, said threshing trough being height adjustable and being removably mounted to be exchanged; means for removable mounting of said introducing drum; and means for removably mounted said threshing trough.

2. A self-propelled harvester thresher as defined in claim 1, wherein said axial threshing and separating mechanism has an axial threshing pin and separating element, said threshing drum and said axial threshing and separating element being located so that said threshing pin drum carries out threshing of the product, whereas an axial threshing and separating element performs post threshing and separation of the product.

3. A self-propelled harvester thresher as defined in claim 1, wherein said introducing drum formed as said threshing pin drum is arranged exchangeable.

4. A self-propelled harvester thresher as defined in claim 1, wherein threshing trough associated with said threshing pin drum is arranged exchangeable.

5. A self-propelled harvester thresher as defined in claim 1, wherein said cutting mechanism trough has a bottom, said axial threshing and separating mechanism also having a bottom, said bottom sheet of said threshing trough being arranged between said bottoms of said cutting mechanism trough and said axial threshing and separating mechanism so as to form an uninterrupted bottom element preventing loss of the product.

6. A self-propelled harvester thresher as defined in claim 1; and further comprising a front driving axle, a rear steering axle and a wind sieve device, said cutting mechanism trough, said axial threshing and separating mechanism, said inclined conveyor, and said wind sieve device are located forwardly of said driving axle.

7. A self-propelled harvester thresher as defined in claim 1, wherein said cutting mechanism trough, said axial threshing and separating mechanism, and said inclined conveyor are formed as separate structural units releasably connected with one another.

8. A self-propelled harvester thresher as defined in claim 1, wherein said introducing drum formed as said threshing pin drum having a plurality of fingers extending through said through-going opening of said cutting mechanism trough.

* * * * *